Oct. 23, 1923.  
C. W. SHIPLEY  
BELT TIRE  
Filed Nov. 15, 1921  
1,471,533  
3 Sheets-Sheet 1

Inventor:  
Caleb W. Shipley.  
By Wood & Wood  
Attorneys

Oct. 23, 1923.
C. W. SHIPLEY
BELT TIRE
Filed Nov. 15, 1921
1,471,533
3 Sheets-Sheet 2
Fig. 3.
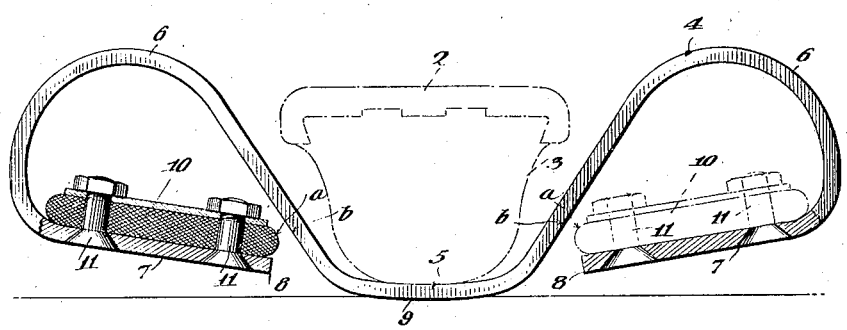
Fig. 4.
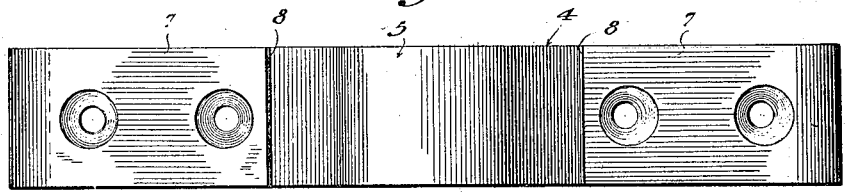
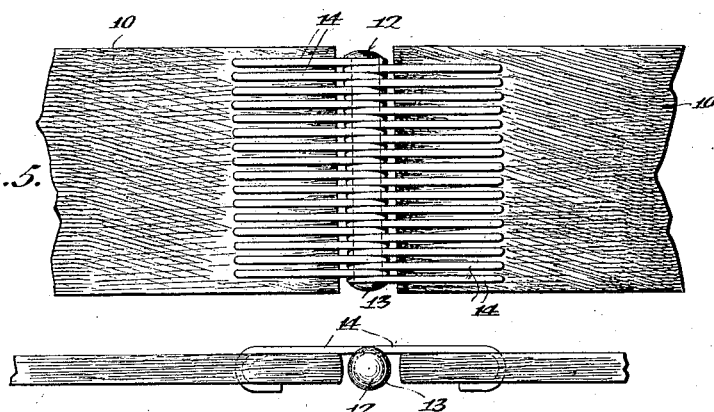
Fig. 5.
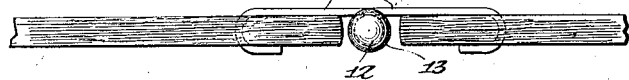
Fig. 6.
Inventor:
Caleb W. Shipley.
By Wood & Wood
Attorneys Oct. 23, 1923.

C. W. SHIPLEY

BELT TIRE

Filed Nov. 15, 1921

Inventor:
Caleb W. Shipley.

By Wood & Wood
Attorneys.

Patented Oct. 23, 1923.

1,471,533

UNITED STATES PATENT OFFICE.

CALEB W. SHIPLEY, OF CINCINNATI, OHIO.

BELT TIRE.

Application filed November 15, 1921. Serial No. 515,394.

*To all whom it may concern:*

Be it known that I, CALEB W. SHIPLEY, a citizen of the United States, and residing at Cincinnati, in the county of Hamilton and State of Ohio, have invented a new and useful Improvement in Belt Tires, of which the following specification is a full disclosure.

The invention relates to what may be designated a belt-tire for vehicle wheels, the object being to provide a demountable tire or wheel tread structure adapted for increased tread and load-sustaining function, in the nature of a supplemental tire for a wheel.

An object of the invention is to provide such a belt-tire adapted to be removably applied to the periphery of a wheel after the manner of anti-skid chains.

The tread structure primarily involves circumferential pliable belts or annuli providing wing extensions from opposite sides of a wheel rim or tire, having a series of transversely disposed flexible cross bars or cleats in spaced arrangement about the circumference of the belts or annuli and shaped to provide means for loosely mounting the tread structure upon the wheel periphery against lateral displacement and for wing sustentation.

The structure preferably comprises two circumferential belts or annular wings medially separated, mounted upon a wheel having a resilient tire, the wheel tire proper occupying the divisional space between said wings, the belts connected by a circumferential series of spring links or cross bars contoured to receive the tire proper and to yieldingly dispose the supplemental wing tire upon opposite sides of the wheel, the wing tires being adapted to be brought into tangential relation to the tread of the wheel tire proper under load.

The structure principle enables at least two different specific embodiments.

A. If normal ground tangency and continuous web contact be desired, the opposite ends of the links may be secured to the inner surfaces of the webs or wings, as illustrated in Fig. 7.

B. If normal non-tangential ground relation and interrupted grip surface be desired, the opposite link ends may be secured upon the outer surfaces of the wings, as illustrated in Figs. 1 to 4 inclusive.

The features of the invention will be more fully set forth in the description of the accompanying drawings, forming a part of this specification, and in the drawings like reference characters denote corresponding parts throughout the several views, of which:

Fig. 3 is a detail view of one of the flexible cross bars, the dot and dash line position of a tire and rim being shown in relation thereto.

Fig. 4 is a plan view of one of the flexible cross-bars.

Figs. 5 and 6 are respectively a plan and edge view illustrating one manner of connecting the ends of the belts.

Figure 2:
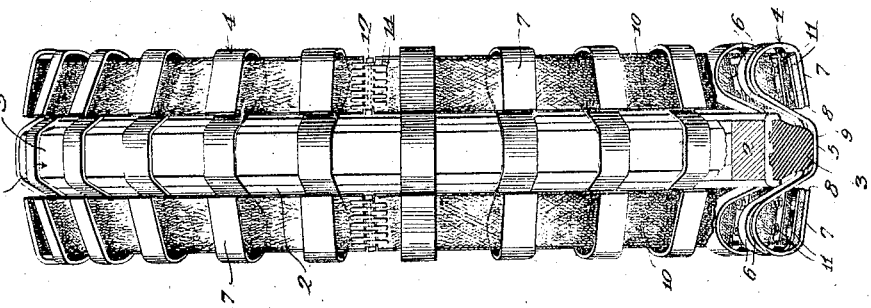
Fig. 2 is an edge elevation, partly in section, of the structure of Fig. 1.
Figure 1:
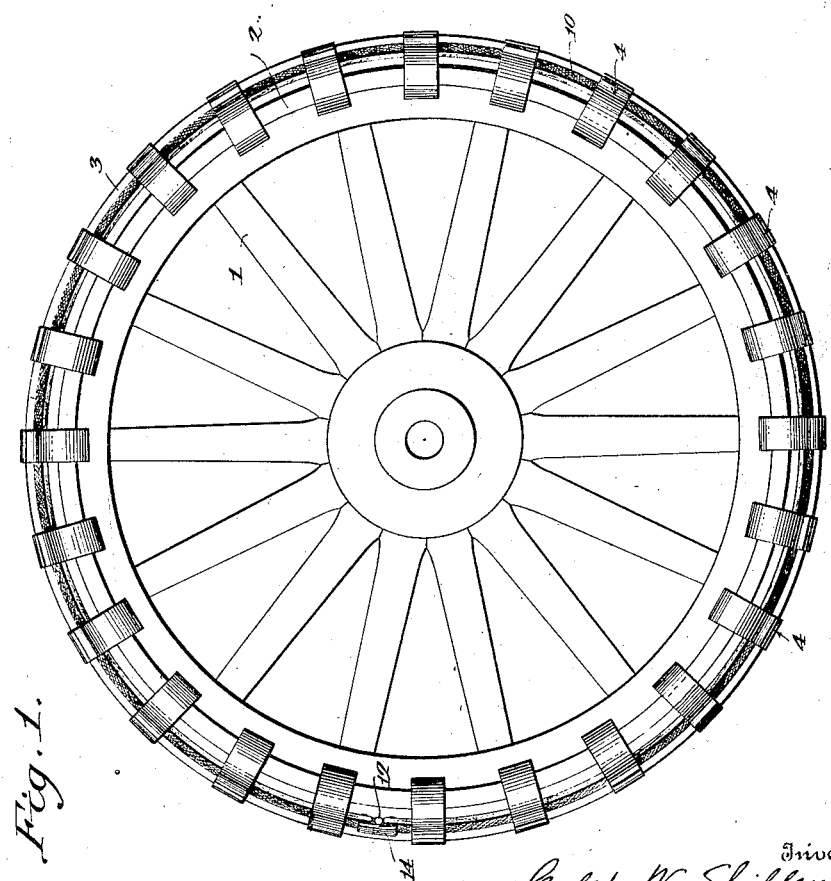
Fig. 1 is a side elevation of the interrupted tread form of belt-tire, applied to a vehicle wheel.
Figure 7:
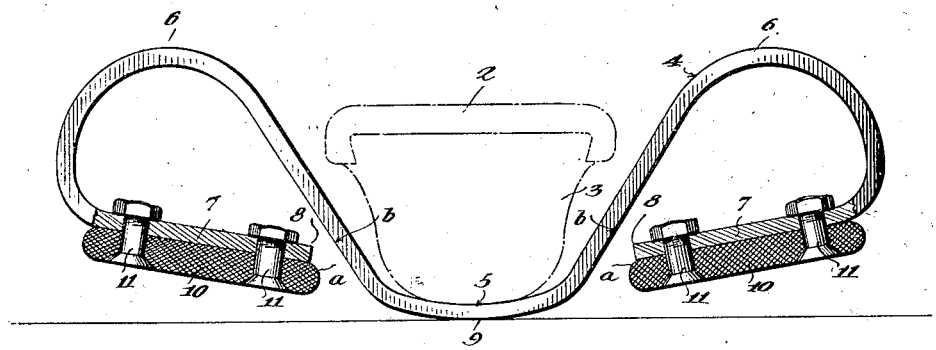
Fig. 7 is a view similar to Fig. 3, showing a modification of the belt-tire designed for continuous web contact.

In Figs. 1, 2, 3, 7 and 8 is shown the conventional wheel 1, rim 2, and solid rubber or cushion tire 3. The spring steel links 4, as cross bars, are formed with a medial yoke-bend 5, receiving the periphery of the wheel and tire, the opposite ends 6 being bent to bow or curve outwardly and downwardly, and then to extend inwardly, to provide plane portions 7, with the extremities 8 brought closely adjacent to the wheel in alignment with one another, but not in alignment with the medial or tread portions of the links. That is to say, these links have the substantially flat or tread medial portions 9 and the flat or shoe extremities 7 forming seats for the tire wings. The circumferential tire wings 10, (counterparts), may be of any suitable flexible or pliable material, leather, rubber or steel fabricated, secured to the said link portions 7, by bolts or rivets 11. The ends of the wings are united into belt structure by the fastening device 12, comprising a stud 13, with the alternate series of metallic or wire hooks 14, lacing the wings to circumferentially embrace the wheel.

The selection offered, of a smooth or of an interrupted surface, or of the tire wings tangent or non-tangent except under load, is optional and inheres in the assembly. If a continuous and smooth contact be desired, as for hard surface roads, the belt tire appliance enables the securance of a very broad and heavy-duty load-sustaining tire tread, comprising the medial portion or tire proper, and the lateral members or auxiliary tire wings. If intended for soft surface roads, irregularities and obstacles, the non-tangential form may be preferred, where the wings will function to present undue rutting of a soft road, and to provide the extended tread compensation for road irregularities or for deviations in transverse road-way level or grade.

These wing tires are not fastened to the wheel at any point but are free to "creep."

The weight of the load is distributed in relation to the contactual area of the medial and wing tires, and as there is no definite attachment to or fixation to the wheel, the appliance will not be subjected to rupturing stresses.

The usage of the appliance enables maximum loading with minimum wear and tear of road surface, and so contributes to a greater durance of both vehicle and road surface.

The usage and function do not parallel the caterpillar instrumentality for the function in this case is essentially load-sustaining and distribution.

In Fig. 3, the shoe portions 7 of the cleats or cross-bars are normally disposed at an angle longitudinally of a line intersecting the central axis line of the cleat at the outside surface of the central tread portion 9. This inclines the cleats at opposite sides of the wheel upwardly and divergently from the wheel tread in opposing directions, so that the two belts as a unit and with the tread surface of the wheel tire effect a dish-like or convexed tread surface, in cross-section, when they are depressed under weight into a soft bearing ground. The cleats being flexible will yield under weight, so that the edge $a$ of the belt abuttingly engages with the upwardly extending portion $b$, which in turn will engage the rim of the wheel. When the almond-shaped spring is used, this conditions a cushioning even when its upper plate is in contact with the rim of the wheel. It has been experienced that with the belts assuming an inclined position at opposite sides of the wheel, and in wheeling over soft ground, that the wheels will not penetrate or sink as deeply thereinto as a plane horizontal tread, nor cause the earth to be lapped over the edge of the belt to such an extent as to materially oppose its rolling propulsion. The structure, therefore, is very efficient upon wheels of trailing vehicles carrying heavy loads drawn over fields, natural surface, drive-ways, or what is known as "mud roads," and the principal utility is in this capacity, that of load sustentation. The cleats as relatively positioned about the belts may possess traction qualities, with the belts free to creep about the wheel and free to rock about the rim and function more as anti-skid or anti-slipping means in traversing soft soil, as the wheels for trailing vehicles are not utilized as driving wheels.

When hard roads are encountered, the wheel tire alone bears the weight of the vehicle, leaving the belts free from the road, under which condition the belts are not subjected to any severe wearing strain except in instances when the belt engages irregularities in the road or obstacles, such as loose stones. The belt being elastic, however, yields to such irregularities or obstacles on the ground and unresisting to shock incident thereto distributes or cushions the shock, protecting the belts and vehicle. The belt being free to creep about the wheels, prevents the wear of the tire at any one place, or tearing of the belts in starting, stopping or in road resistance, as would occur if the belt were not free to slip or yield to the strain. The intermediate portion of the cleats between the belts, while the wheel travels over hard surfaces, qualifies as an anti-slipping means.

While the primary function of the tire is for load sustaining upon soft surface, it also possesses traction qualities when used upon the propelling wheels of a motor vehicle in traveling over snow. The use of the tire in this capacity is very efficient and serviceable on automobiles in the snow belts in which territories the motor vehicles cannot be safely used during the winter seasons.

Figure 8:
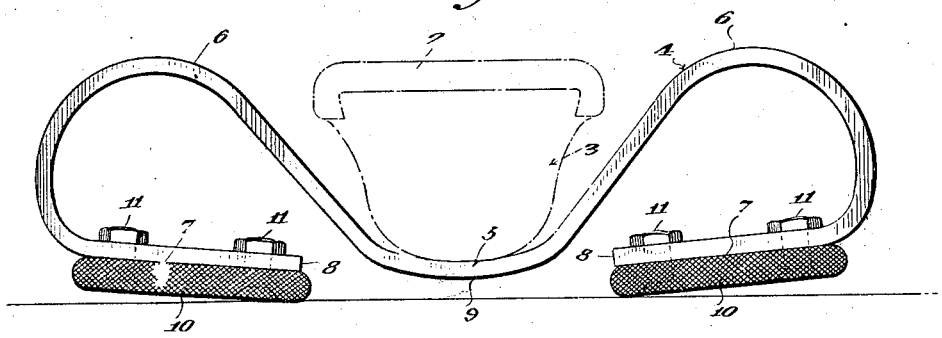
Fig. 8 is a similar view showing a second modification, wherein the wheel is normally entirely supported upon the webs of the belt-tire.

In the modification shown in Fig. 8, the belts are shown as secured on the lower face of the shoe portions 7 of the cleats, which shoe portions assume an approximate horizontal position, and at an elevation which will bring the intermediate portion normally above the ground line, so that the belts furnish the primary tread surface and the cleats of a spring tension which will sustain the wheel carrying load for the purpose of providing resilient tires with increased tread width, to prevent the cutting of soft paved roads or surfaces where freight hauling vehicles are usually not permitted, such as park drives or lawn surfaces.

Having described my invention, I claim:

1. A vehicle wheel tire comprising two separate circumferential tire wings, providing a divisional space for the wheel tire, a series of spring links, the opposite ends of which are provided with shoes attached to said wings, and the medial portions of said links being bowed to receive the wheel tire proper, means for attaching the respective meeting ends of said wings to constitute tire belts unitarily conforming to the wheel circumference and free to creep in relation thereto.

2. A vehicle wheel tire comprising two separate circumferential tire wings, providing a divisional space for the wheel tire, a series of spring links, the opposite ends of which are provided with shoes attached to said wings, and the medial portions of said links being bowed to receive the wheel tire proper, means for attaching the respective meeting ends of said wings to constitute tire belts unitarily conforming to the wheel circumference and free to creep in relation thereto, the said spring links being contoured and tensioned to bring the wing tires into load sustaining and distributing coaction with the wheel tire proper in heavy duty service.

3. A vehicle wheel tire comprising a circumferential webbing loosely mounted about a wheel rim and providing a circumferential ring extension for the rim, and means secured to said webbing for sustaining the webbing about the wheel rim.

4. A vehicle wheel tire comprising a pliable webbing band loosely sustained upon the wheel periphery and providing a wing extension therefor, and means for maintaining said band in its wing extended position upon said wheel.

5. A vehicle tire comprising a pair of pliable webs, adapted to be circumferentially, loosely mounted about the wheel periphery and respectively projecting from opposite sides thereof, to provide wing tread extensions therefor.

6. A vehicle tire comprising a pair of pliable webs, adapted to be circumferentially loosely mounted about the wheel periphery and respectively projecting from opposite sides thereof, to provide wing tread extensions therefor, and a series of cleats transversely fixed to said webs and relatively spaced for connecting said webs, said cleats yoked about the wheel periphery and free to transversely rock thereon.

7. A vehicle tire comprising a pair of pliable webs adapted to be circumferentially loosely mounted about a wheel periphery and respectively projected from opposite sides thereof, to provide wing tread extensions therefor, cleats for connecting and mounting said webs about a wheel periphery, each composed of a strip of flexible material formed to provide a central bowed portion to yoke the wheel periphery, and opposite looped ends having inwardly extending ends secured respectively transversely to a web.

8. A vehicle tire comprising a pliable web as an annulus, adapted to be circumferentially loosely and removably mounted about a wheel periphery, to provide a wing tread extension, and means for loosely anchoring said web about the tire and support the same in a wing tread extending position about a wheel periphery.

9. In a vehicle tire comprising a pair of pliable webs and as an annulus adapted to be circumferentially loosely mounted about a wheel periphery, to provide wing tread extensions from opposite sides of a wheel, and cleats for connecting said webs and supporting said webs about a wheel periphery and sustaining the web in opposing inclined position to provide an auxiliary increased wheel tread.

In witness whereof, I hereunto subscribe my name, as attested by the two subscribing witnesses.

CALEB W. SHIPLEY.

Witnesses:
L. A. BECK,
G. C. AREY.